US 007869487B2

(12) United States Patent
Gilmour et al.

(10) Patent No.: US 7,869,487 B2
(45) Date of Patent: Jan. 11, 2011

(54) QUADRATURE MULTI-FREQUENCY RANGING (QMFR) APPLIED TO GPS MULTIPATH MITIGATION

(75) Inventors: Paul A. Gilmour, Bloomfield, NJ (US); Dennis D. McCrady, Holmdel, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 774 days.

(21) Appl. No.: 11/501,066

(22) Filed: Aug. 9, 2006

(65) Prior Publication Data

US 2006/0274818 A1    Dec. 7, 2006

Related U.S. Application Data

(63) Continuation of application No. 10/190,606, filed on Jul. 9, 2002, now Pat. No. 7,154,937, and a continuation-in-part of application No. 09/365,702, filed on Aug. 2, 1999, now Pat. No. 6,453,168.

(60) Provisional application No. 60/303,511, filed on Jul. 9, 2001.

(51) Int. Cl.
*H04B 1/707* (2006.01)
*H04B 1/713* (2006.01)

(52) U.S. Cl. ...................................... 375/148; 375/136

(58) Field of Classification Search .................. 375/130, 375/132, 135, 136, 140, 146–148, 295
See application file for complete search history.

(56) References Cited

U.S. PATENT DOCUMENTS

| 5,283,780 | A | * | 2/1994 | Schuchman et al. | 370/312 |
| 5,506,862 | A | * | 4/1996 | McIntosh | 375/130 |
| 5,521,937 | A | * | 5/1996 | Kondo et al. | 375/144 |
| 5,838,717 | A | * | 11/1998 | Ishii et al. | 375/131 |
| 6,453,168 | B1 | | 9/2002 | McCrady et al. | |

FOREIGN PATENT DOCUMENTS

WO    WO 01/10154    2/2001

OTHER PUBLICATIONS

A. J. Van Dierendonck et al., "Theory and Performance of Narrow Correlator Spacing in a GPS Receiver" Navigation: Journal of The Institute of Navigation, vol. 39, No. 3, Fall 1992, pp. 265-283.

(Continued)

*Primary Examiner*—Kevin M Burd
(74) *Attorney, Agent, or Firm*—Davidson Berquist Jackson & Gowdey, LLP

(57) ABSTRACT

A quadrature multi-frequency ranging system applied to DSSS multipath mitigation problems is described. The QMFR techniques include taking the time-of-arrival measurements on the received signal at a time when the multipath component is at a 90 degree angle to the direct path. Further, the preferred embodiment of the present invention recognizes that when a signal is transmitted at a series of frequencies, and the spread of these frequencies is sufficient, a quadrature or near quadrature condition can be forced to occur, at which the TOA estimation gives the highest certainty of measurement.

5 Claims, 17 Drawing Sheets

OTHER PUBLICATIONS

Benjamin B. Peterson et al., "Spread Spectrum Indoor Geolocation", Navigation: Journal of The Institute of Navigation, vol. 45, No. 2, 1998, pp. 97-102.

Bryan R. Townsend et al., "Performance Evaluation of the Multipath Estimating Delay Lock Loop", Ion National Technical Meeting, Anaheim, CA, Jan. 18-20, 1995, pp. 1-7.

Charles T. Bye et al., "Development of a FOG-based GPS/INS", Position Location and Navigation Symposium, Apr. 20-23, 1998, pp. 264-271.

Dennis D. McCrady et al., "Mobile Ranging Using Low-Accuracy Clocks", IEEE Transactions on Microwave Theory and Techniques, vol. 48, No. 6, Jun. 2000, pp. 951-957.

Dennis McCrady et al., "Mobile Ranging Using Low Accuracy Clocks", pp. 1-7, Jun. 2000.

European Search Report mailed Oct. 24, 2003 in corresponding European Application No. 02014984.5-2411.

J.J. Spilker, Jr. et al., "Overview of GPS Operation and Design", American Institute of Aeronautics and Astronautics, Inc., vol. 163, pp. 29-55, 1994.

Mats Brenner et al., "GPS Landing System Multipath Evaluation Techniques and Results", ION GPS-98, Nashville, TN, Sep. 15-18, 1998, pp. 999-1008.

R. J. Buchler et al., "Design and Test of a Synergistic Interferometric GPS-INS", Position Location and Navigation Symposium, Apr. 22-26, 1996, pp. 612-619.

Richard D.J. van Nee et al., "The Multipath Estimating Delay Lock Look: Approaching Theoretical Accuracy Limits", Position Location and Navgation Symposium, Apr. 11-15, 1994, pp. 246-251.

Richard D.J. van Nee, "Multipath Effects on GPS Code Phase Measurements", Navigation: Journal of the Institute of Navigation, vol. 39, No. 2, Summer 1992, pp. 177-190.

Steven N. Karels et al., "Extending Narrow-Correlator Technology to P(Y)-Code Receivers: Benefits and Issues", ION GPS-94, Sep. 20-23, 1994, 6 pages.

* cited by examiner

PRIOR ART [Spilker, et al, "overview of GPS generation and Design," Global Positioning System, Theory and applications. Vol. 1, A1AA Vol. 163, p.53].

PRIOR ART [Brenner, et al, "GPS Landing System Multipath Evaluation Techniques and results," on GPS-98, p.1000, Nashville, TN. September 15-18, 1998].

PRIOR ART [Brenner, et al at p.1000].

FIGURE 4    PRIOR ART    [Brenner, et al at p.1000].

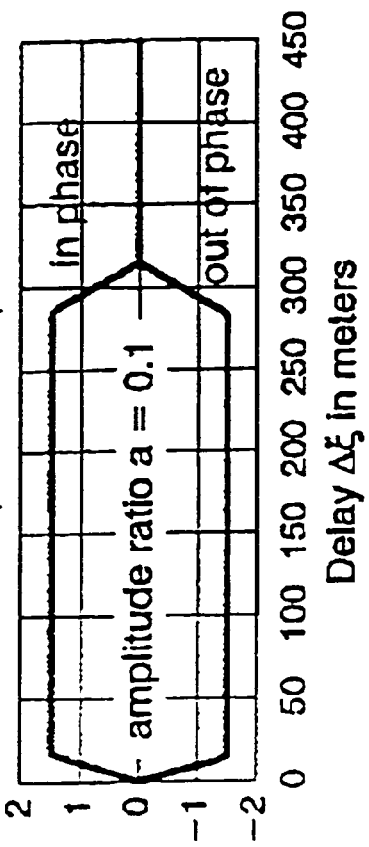
FIGURE 6 PRIOR ART [Brenner, et al at p.1005].
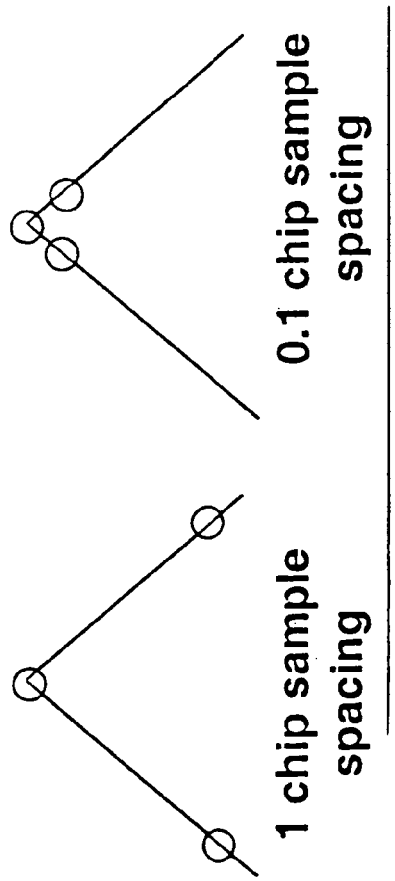
FIGURE 5 PRIOR ART

| PARAMETER | STANDARD P(Y) (20 MHz BW) | NARROW-CORRELATOR (Hypothetical 80 MHz BW) |
|---|---|---|
| Ranging Precision (m) | 0.28 | 0.22 |
| Ground Multipath (m) | 0.60 | 0.23 |
| Aircraft Multipath (m) | 0.14 | 0.14 |
| Receiver Error – RSS (m) | 0.68 | 0.34 |

FIGURE 8

PRIOR ART [Karels, et al., "Extending Narrow-Correlator Technology to P(Y)- code Receivers: Benefits and Issues", ION, GPS-94, September 20-23, 1994].

| User Type ⇒<br>Multipath<br>Environment ⇓ | Stationary;<br>SV-Only;<br>CA-Code | Mobile;<br>SV-Only;<br>CA-Code | Stationary;<br>SV-Only<br>+20 dB;<br>M-Code | Stationary;<br>SV plus<br>L-Band PL;<br>MF M-Code | Stationary;<br>SV plus<br>UHF PL;<br>MF M-Code |
|---|---|---|---|---|---|
| Ground reflection | Q1-FTA<br>Q1-LEA<br>Q2-NIHAM | Q1-FTA<br>Q2-NIHAM | Q1-FTA<br>Q1-LEA<br>Q2-NIHAM | Q2-NIHAM | Q2-NIHAM |
| Dominant single reflector | Q1-FTA<br>Q1-LEA<br>Q2-NIHAM | Q1-FTA<br>Q2-NIHAM | Q1-FTA<br>Q1-LEA<br>Q2-NIHAM | Q2-NIHAM | Q2-NIHAM |
| Diffuse multipath | NB | NB | NB | NB | NB |
| Urban canyon | NB | NB | When direct path thru buildings:<br>Q1-FTA<br>Q2-NIHAM | When direct path thru buildings:<br>Q2-NIHAM | Q2-NIHAM |
| Inside building | NB | NB | When adequate signal strength:<br>Q1-FTA<br>Q2-NIHAM | When adequate signal strength:<br>Q2-NIHAM | Q2-NIHAM |

Q1 = Recognize quadrature condition
Q2 = Force quadrature condition via MF transmission
FTA = Faster than averaging
LEA = Lower elevation angles NIHAM = Near-instantaneous high-accuracy measurement
NB = No benefit
PL = Pseudolite
MF = Multiple-Frequency

FIGURE 21

| User Type ⇒<br>Multipath Environment ⇓ | Stationary; SV-Only; CA-Code | Mobile; SV-Only; CA-Code | Stationary; SV-Only +20 dB; M-Code | Stationary; SV plus L-Band PL; MF M-Code | Stationary; SV plus UHF PL; MF M-Code |
|---|---|---|---|---|---|
| Ground reflection | ANT<br>QMFR | QMFR | ANT<br>QMFR | QMFR<br>ANT | QMFR<br>ANT |
| Dominant single reflector | ANT<br>QMFR | QMFR | ANT<br>QMFR | QMFR<br>ANT | QMFR<br>ANT |
| Diffuse multipath | | | | | |
| Urban canyon | IA | IA | IA<br>QMFR[1] | IA<br>QMFR[1] | QMFR<br>IA |
| Inside building | IA | IA | IA<br>QMFR[2] | IA<br>QMFR[2] | QMFR<br>IA |

ANT = Multipath-resistant antenna technology
IA = Inertial Aiding
Note 1: When direct path or direct path through building is available.
Note 2: When signal strength is adequate.

FIGURE 22

QUADRATURE MULTI-FREQUENCY RANGING (QMFR) APPLIED TO GPS MULTIPATH MITIGATION

CROSS-REFERENCES TO RELATED APPLICATIONS

This application is a continuation of U.S. application Ser. No. 10/190,606, filed Jul. 9, 2002, which is a continuation-in-part of patent application Ser. No. 09/365,702, filed Aug. 2, 1999, and which claims the benefit of provisional application Ser. No. 60/303,511 filed on Jul. 9, 2001.

FIELD OF THE INVENTION

The present invention relates to satellite communications and more particularly to Global Positioning System (GPS) or other Direct Sequence Spread Spectrum (DSSS) multipath mitigation techniques.

BACKGROUND AND SUMMARY OF THE INVENTION

DSSS systems include GPS transmitter/receiver systems that perform time-of-arrival (T.O.A.) determinations between a DSSS transmitter (such as a GPS satellite) and a DSSS receiver (such as GPS user equipment). The present invention applies to all DSSS Systems, but will be described for convenience with request to a GPS system herein. Multipath problems within GPS systems are well known and take a variety of different forms including ground reflection, single reflection (diffraction), diffuse multipath, and mobility-induced errors. Each of these is discussed below:

(1) Ground reflection. A strong multipath signal between a GPS satellite and a GPS user equipment (for example 100% reflected power) can originate from ground or sea surface reflections, as shown in FIG. 1. If the angle E is a low elevation angle and/or the user altitude h is low, the multipath may be only slightly delayed from the main path between the GPS satellite and the user equipment. If the multipath delay is less than 1.5 chips, the multipath delay degrades the signal TOA estimation. For C/A-code, this condition occurs for:

Delay $=\Delta R/c = 2h \sin E/c < 1.5$ µs.

Ground or sea surface reflections and the effects thereof are described in Spilker, "Overview of GPS Operation and Design," American Institute of Aeronautics and Astronautics, Inc. Vol. 163 at page 53 (1994). A typical behavior of the ground reflection error after smoothing as the satellite travels across the sky is described in Brenner, "GPS Landing System Multipath Evaluation Techniques and Results," at pages 1001-2.

(2) Single Reflector (or Diffractor). Another multipath problem occurs when a single reflector or diffractor creates a multipath signal between the user equipment and the GPS satellite. Such a multipath problem is illustrated in FIG. 2, where the main path signal (on top of FIG. 2) and the multiple path (on the bottom of FIG. 2) between a user equipment and GPS satellite are shown being created by the diffractor. Brenner, "GPS Landing System Multipath Evaluation Techniques and Results," ION GPS-98, at pages 1000-1001 (Conference on September 15-18, 1998) also describes the resultant multipath-induced position error, which is reproduced by way of example in FIG. 3.

(3) Diffuse multipath. Another type of multipath problem occurs with uniformly scattered diffractors, as shown in FIG. 4. In the case of uniformly scattered diffractors, the power equals $P_{\mathit{diff}}$. $(0.2/dr^2)$. The smoothed multipath error in the case of diffuse multipaths is described in Brenner at pages 1000-1001.

(4) Effect of mobility. Still another multipath problem that exists between GPS satellites and user equipment occurs as a result of mobility in the user equipment. According to Van Nee, "Multipath Effects on GPS Code Phase Measurements," Navigation, Vol. 39, No. 2, Summer 1992 at pages 179-180, the motion of the user equipment causes differences in Carrier Doppler frequencies between reflections in the line of sight of stationary users versus mobile users. That is, the fading bandwidth is determined by the Doppler differences, which varies substantially for stationary users versus mobile users. Further, reduction of the multipath error variance requires an averaging time much greater than 1/fading bandwidth. For stationary users, maximum Doppler difference is 0.6 Hz (and most users even experience much lower values). Mobile users, however, experience much higher fading bandwidth, e.g., for v=15 m/s, Doppler differences can take values up to 180 Hz. As a result, smoothing techniques require long time constants (on the order of 100 seconds) for stationary users but can use much shorter time constants for mobile users.

Still further multipath signal generation can be caused by terrain (such as) urban canyons and by signal reception within buildings.

There are current receiver technologies that attempt to mitigate the multipath disorders. Current GPS transmitter/receiver systems attempt to perform time of arrival determinations on the GPS spread spectrum waveform by (1) correlating the received signal with a replica of the transmitted signal and then (2) finding the time location of the peak magnitude of the correlation. They either locate the peak directly or by curve-fitting an ideal correlation function (a triangular pulse) with the actual received signal correlation function. Three recent systems for receiver technology improve the TOA estimation accuracy of the GPS receiver in a multipath environment:

(a) Narrow correlator (Novatel™). The narrow correlator uses a correlator spacing of a fraction of a chip rather than chip-spaced correlators, as illustrated in FIG. 5. Using a fraction of a chip greatly reduces the magnitude of the maximum TOA error in a multipath environment. The error reduction by the narrow correlator is described by Van Dierendonck et al., "Theory and Performance of Narrow Correlator Spacing in a GPS Receiver," Navigation, Vol. 39, No. 3, Fall 1992, at pages 265-283 and reproduced by way of summary in FIG. 6. In FIG. 6, the multipath error for a single diffractor, with narrow correlation is illustrated.

Others have extended narrow correlators to P(Y) code receivers, e.g., Karels, et al. "Extending Narrow-Correlator Technology to P(Y)-Code Receivers: Benefits and Issues," ION GPS-94 Sep. 20-23, 1994, investigated using narrow-correlator techniques on P(Y)-code receivers. Karels et al opined that improvements in overall GPS receiver performance obtained in commercial GPS receivers over standard C/A-code receivers may be extended to P(Y)-code GPS receivers but only if the GPS space vehicle (SV) spectral output is permitted to increase. A table of Karels, et al., finding is reproduced as FIG. 8.

(b) Multipath estimating delay lock loop (MEDLL) (Novatel™). MEDLL makes multipath error correction by assuming that no more than two dominant multipath signals are present. It estimates the amplitude, delay, and phase of each multipath component using maximum likelihood criteria and then subtracts each estimated multipath correlated function from the measured correlation function. The remaining direct path correlation function has minimal multipath degradation, and it can be used for accurate TOA estimation. The technique is described by Towsend, et al., "Performance Evaluation of the Multipath Estimating Delay Lock Loop," ION National Technical Meeting Jan. 18-20, 1995, and exhibits multipath error correction illustrated by way of summary in FIG. 7. In practicality, the MEDLL technique gives performance that's comparable to a p-code receiver.

(c) Leading edge curve fitting. A third system for improving TOA estimation accuracy of a GPS receiver in a multipath environment is the leading edge curve fitting technique first used by the present assignee for W-sensor applications and for small unit operations programs. The leading edge curve fitting technique matches the receive signal correlation with an ideal correlation function on the leading edge of the received signal correlation. This minimizes the impact of any delayed multipath signals when computing the TOA, because the multipath has its greatest influence on the trailing edge of the correlation.

The preferred embodiment of the present invention provides a more useful receiver technology for improving the TOA estimation accuracy by utilizing a QMFR technique in the GPS application. This technique reduces the influence of close-in multipath components by examining the complex correlation function of the received signal rather than just the magnitude of the correlation function. It uses curve fitting on the complex correlation signal to locate the correlation peaks due to the main (undelayed) path in the delayed multipath component, and then measures the phase angle between those peaks.

BRIEF DESCRIPTION OF THE DRAWINGS

FIGS. 5-6 address the prior art narrow correlator technique to mitigate multipath problems;

FIG. 8 illustrates the effect of narrow correlator techniques on P(Y)-code receivers;

FIG. 21 is a table of example benefits of embodiments of the present QMFR system;

FIG. 22 is a table of recommended approaches for multipath mitigation in addition to narrow correlation.

DETAILED DESCRIPTION OF A PRESENTLY PREFERRED EMBODIMENT

Figure 1:
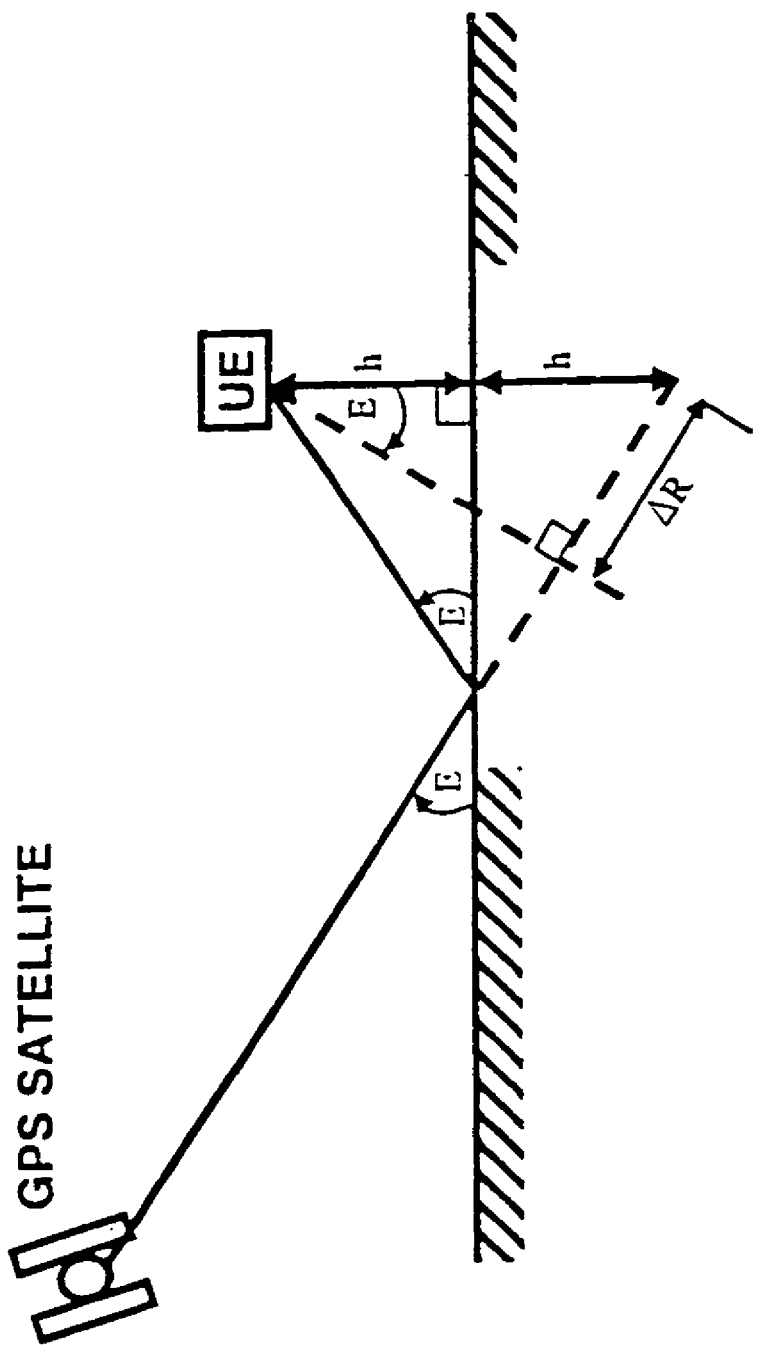
FIG. 1 is a prior art illustration of the multipath problem addressed by the present invention.
Figure 2:
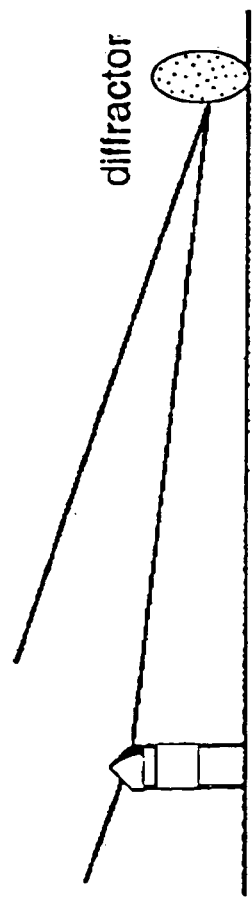
FIGS. 2-3 are prior art illustrations of the single reflector multipath problem.
Figure 3:
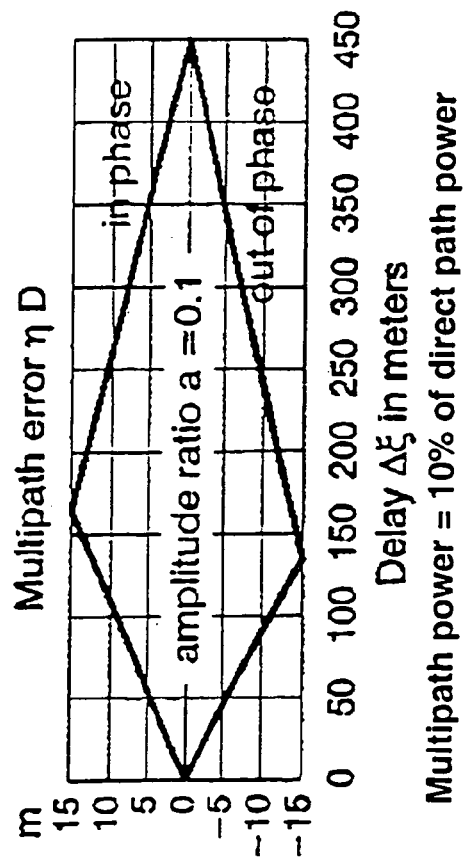
Figure 4:
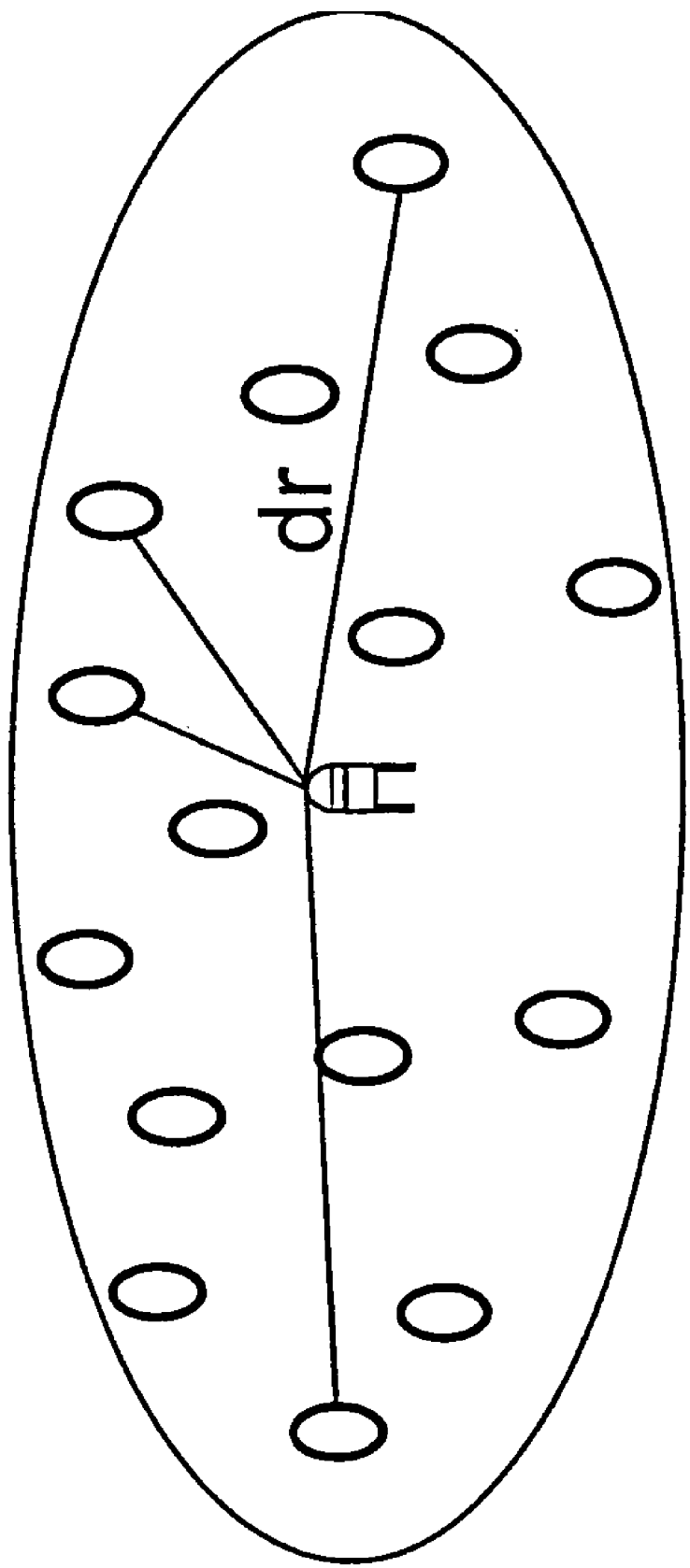
FIG. 4 illustrates the diffuse multipath problem.
Figure 7:
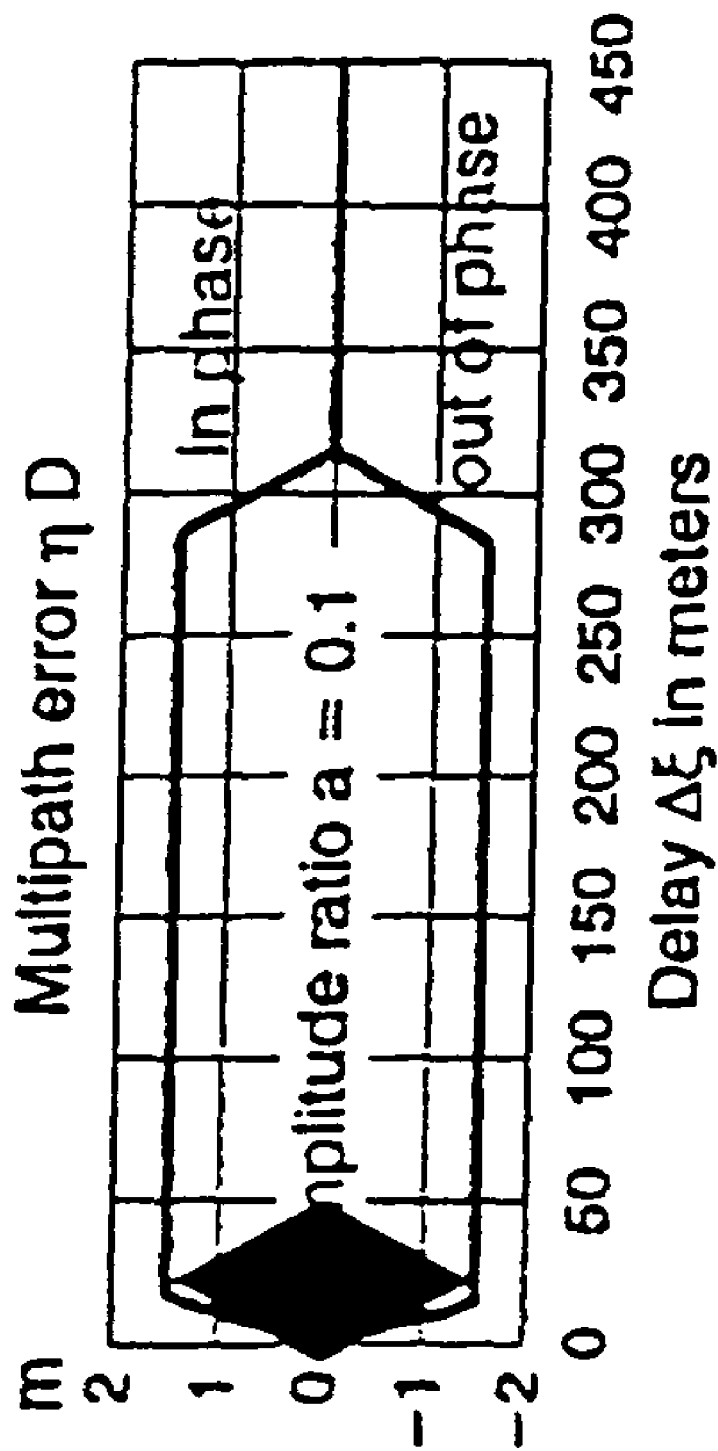
FIG. 7 illustrates multipath error correction by the prior art multipath estimating delay lock loop receivers.
Figure 9:
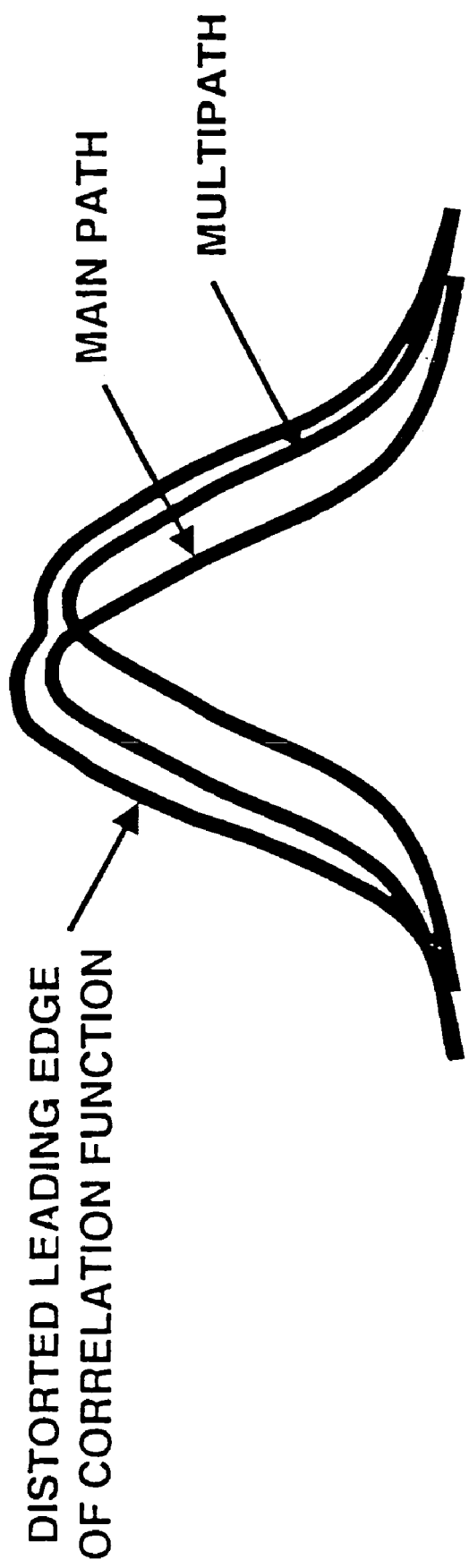
FIGS. 9-19 illustrate a presently preferred technique for recognizing quadrature condition in most GPS receivers in accordance with an example aspect of the present invention.

As shown in FIG. 9, the TOA estimate is degraded by interference of delayed multipath signals with the correlation peak due to the undelayed main path signal, shown in FIG. 9. This is particularly true for multipath signals that are delayed by less than 1.5 times the chip duration. Receivers other than the present invention, such as the narrow correlator, MEDLL, and leading edge curve fitting embodiments, do not improve performance as well as the present invention. Even when the above mentioned curve fitting on the leading edge of the received signal is used as a correlation function, the influence of a close-in multipath component is still severely degrading as to the TOA estimates. The narrow correlator and MEDLL techniques, although they significantly improve performance against multipath, still do not take advantage of the quadrature condition, as described below. Moreover, to extend the narrow correlator technique to work for P(Y)-code and M-code would require a large bandwidth increase in order to achieve significantly improved multipath performance.

Figure 10:
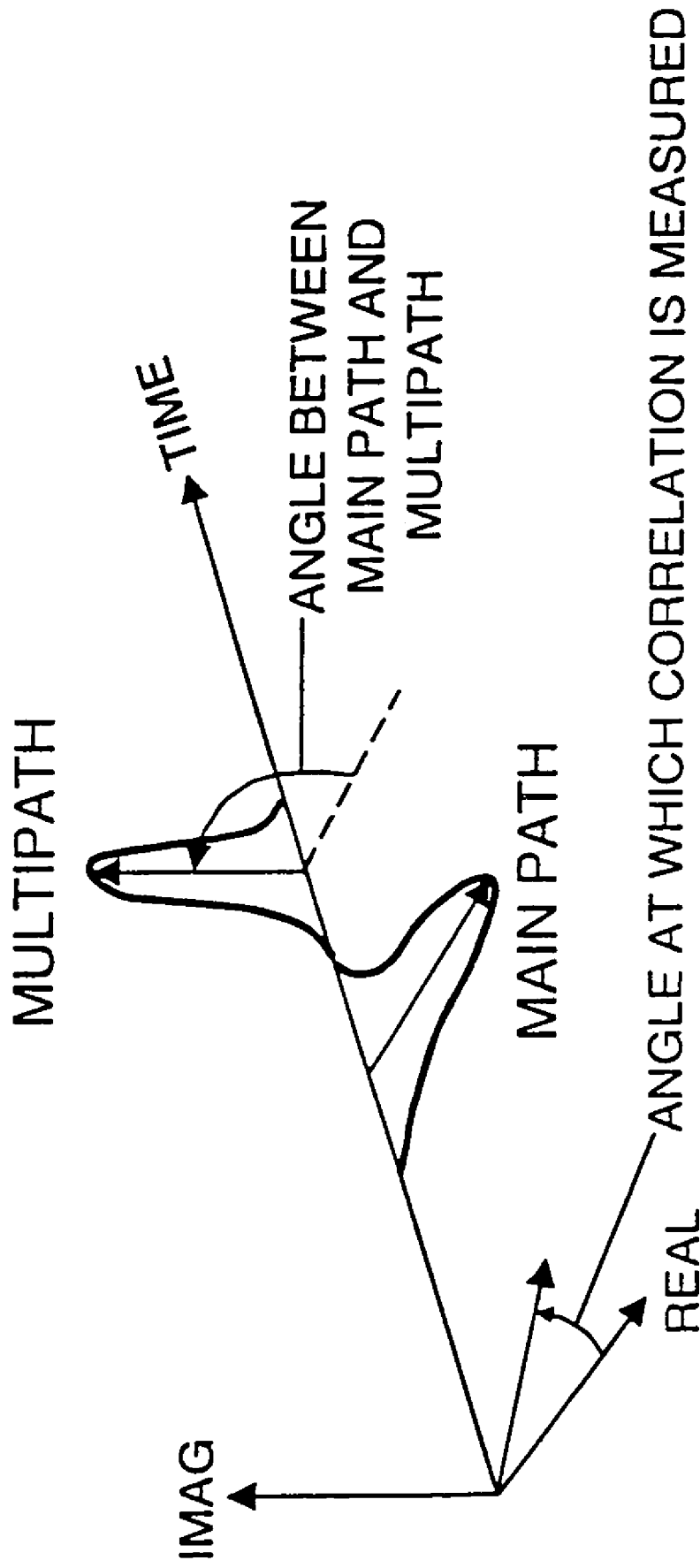

Thus, the presently preferred embodiment of the present invention utilizes the QMFR technique and extends it to application of the GPS multipath problem. The QMFR technique reduces the influence of close-in multipath components by examining the complex correlation function of the received signal rather than just the magnitude of the correlation function. Thus, as shown in FIG. 10, the QMFR concept utilizes the complex correlation function in which the main path and multipath components arrive with arbitrary phase angles in the complex correlation. The preferred embodiment uses curve fitting on the complex correlation signal to locate the correlation peaks due to the main (undelayed) path and the delayed multipath component, and then measures the phase angle between these peaks.

Figure 19:
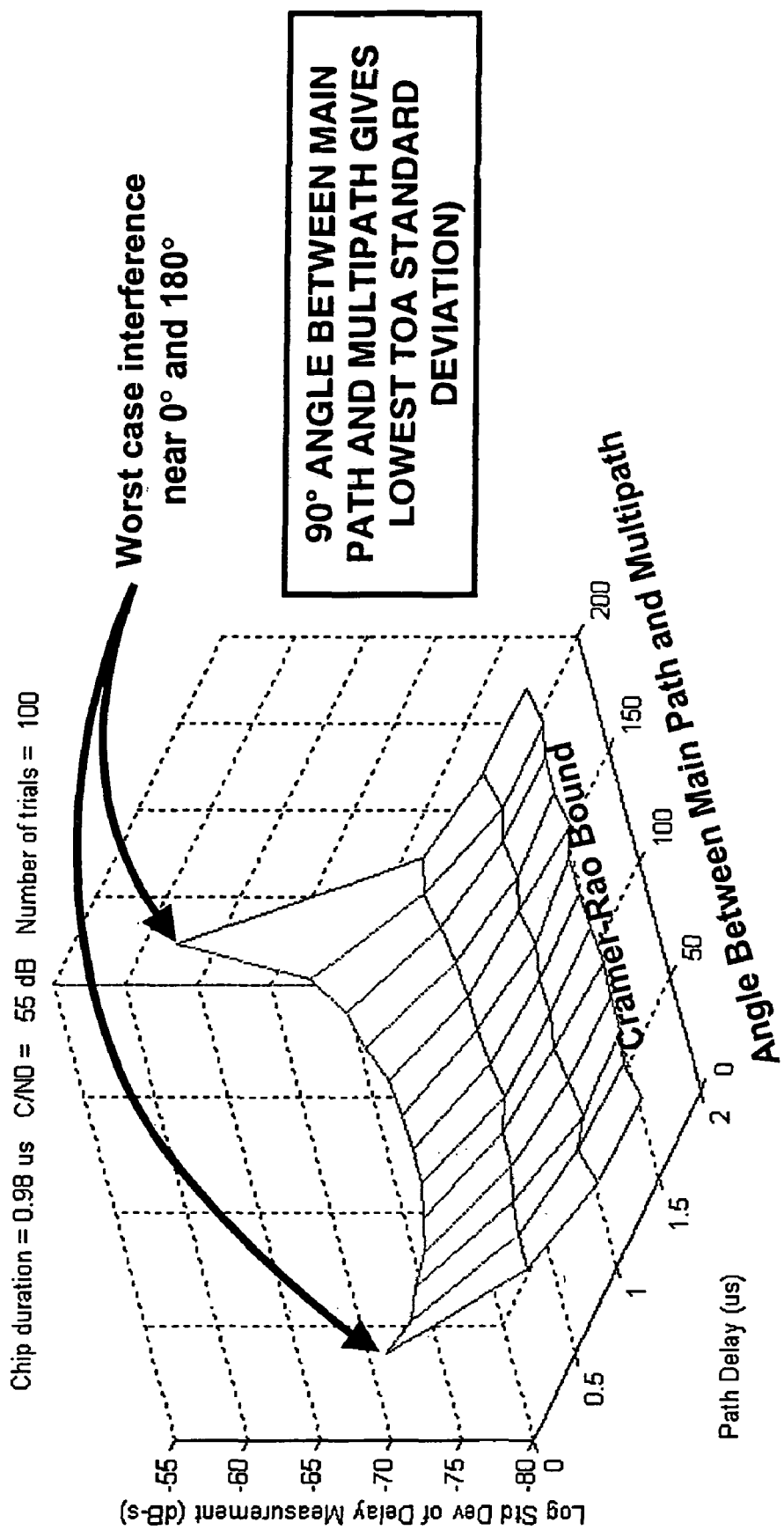

The preferred embodiment of the present invention applies first and second QMFR principles. The first QMFR principle (Q1) supposes that the best TOA estimate on the main path can be obtained when the delayed multipath component is at a 90 degree angle to the main path, as shown in FIG. 19. Recognizing this first principle, the present invention utilizes the understanding that the main path and multipath components arrive with arbitrary phase angles in the complex correlation and that certain phase angles have less interference by the multipath component on the main path's leading edge. The present inventors have found that the best angle is 90 degrees and thus the QMFR concept of the preferred embodiment waits for this 90 degree angle condition to occur and then measures the TOA.

Thus, the preferred embodiment detects an instance when the 90 degree or "quadrature" condition occurs, and then does leading edge curve-fitting on the main path in the complex domain. This results in significantly higher TOA accuracy than leading edge curve fitting on the magnitude of the correlation function. Locating and utilizing the quadrature condition also gives improved performance over narrow correlator and MEDLL, which operate at arbitrary phase angles between the direct and multipaths. Also there is no increase in bandwidth necessary to use the quadrature condition for P(Y)-code or M-code, unlike what is required with narrow correlation.

Figures 11, 12:
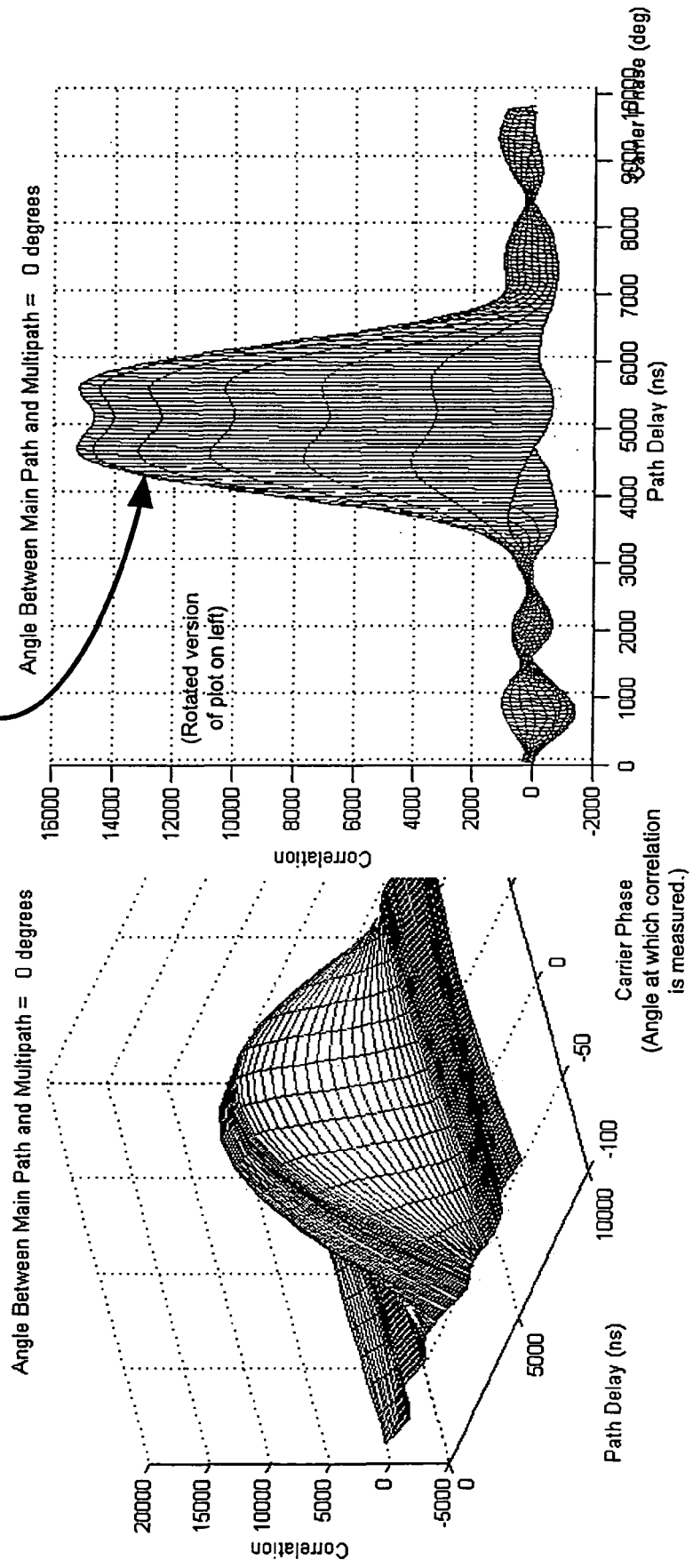

FIGS. 11-18 are graphical representations of the advantages gained by the present invention. FIG. 11 and 12 are, respectively, three-dimensional and two-dimensional displays of the correlation function with the multipath delayed by 1.2 chips (using C/A code). In this embodiment, the angle between the main path and the multipath is 0 degrees. As shown, the constructive interference between the multipath and main path causes an early leading edge curve fit TOA estimate.

Figure 14:
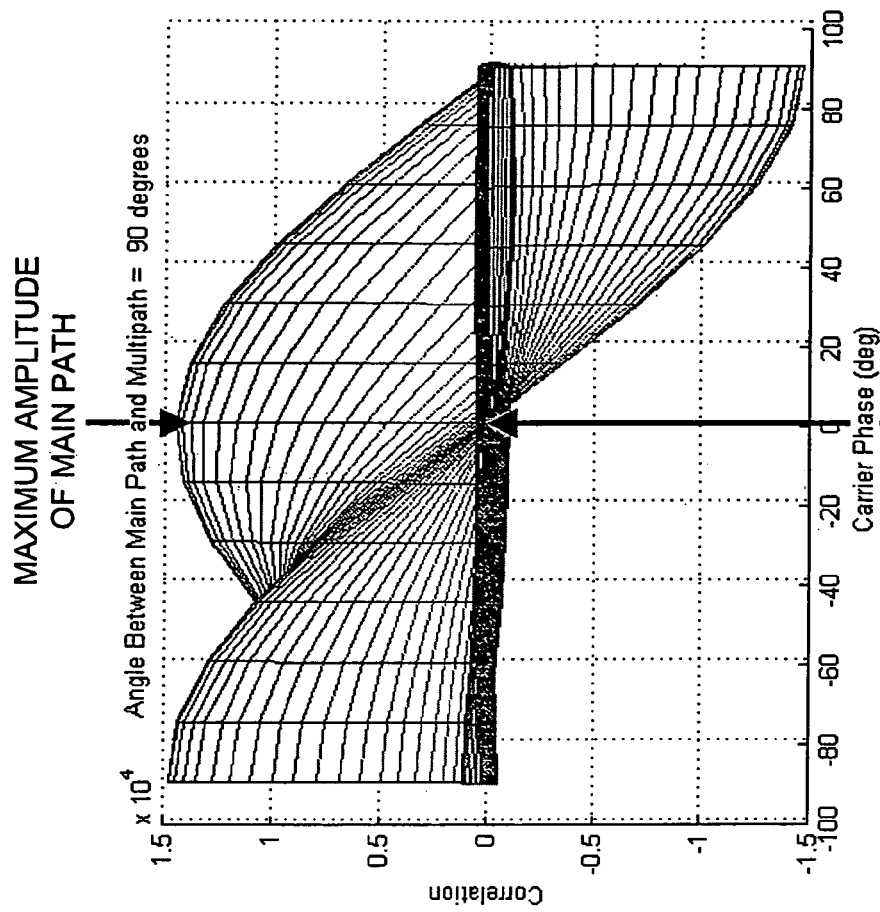
Figure 13:
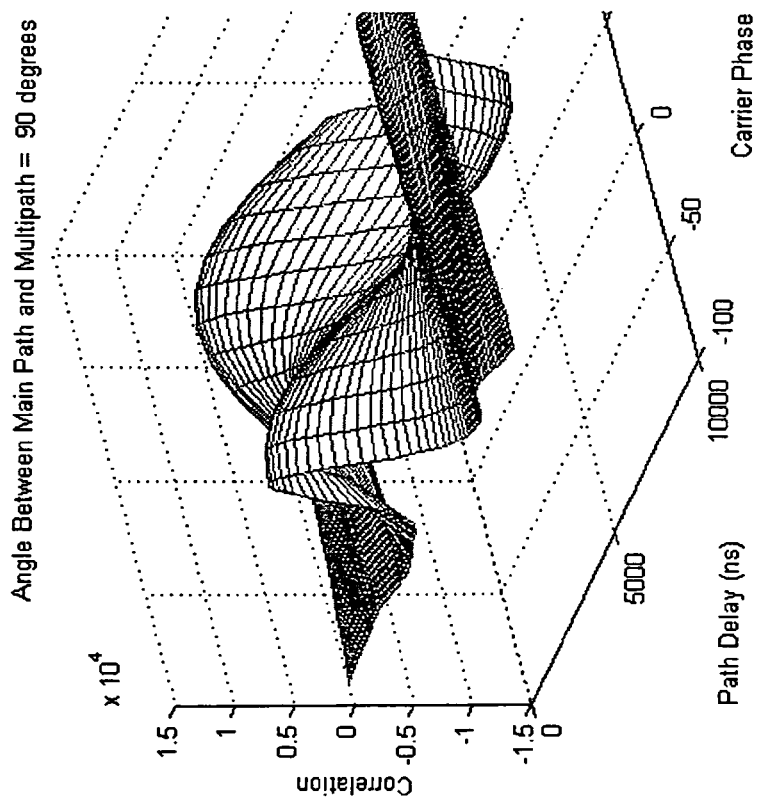

FIGS. 13 and 14 are similar three-dimensional and two-dimensional graphs illustrating the correlation function when the angle between the main path and the multipath is 90 degrees. As shown particularly in FIG. 14, the maximum amplitude of the main path occurs with no interference from the multipath at the angle of 90 degrees.

Figure 16:
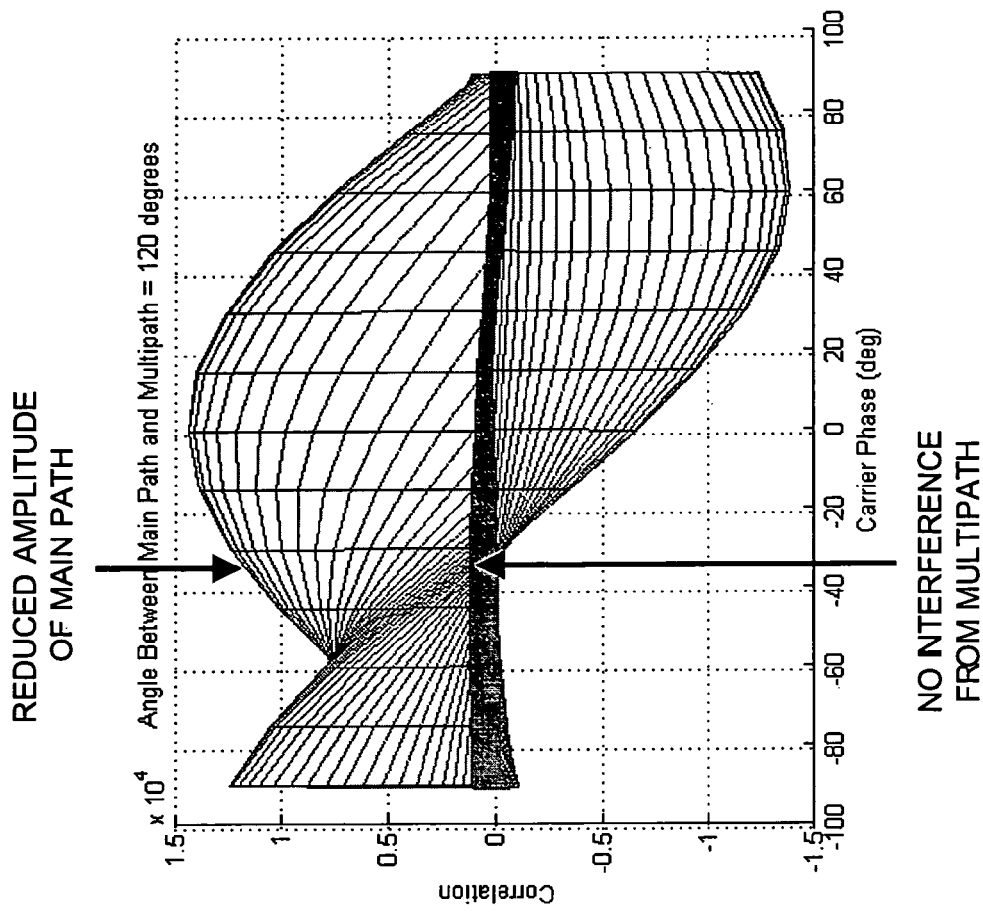
Figure 15:
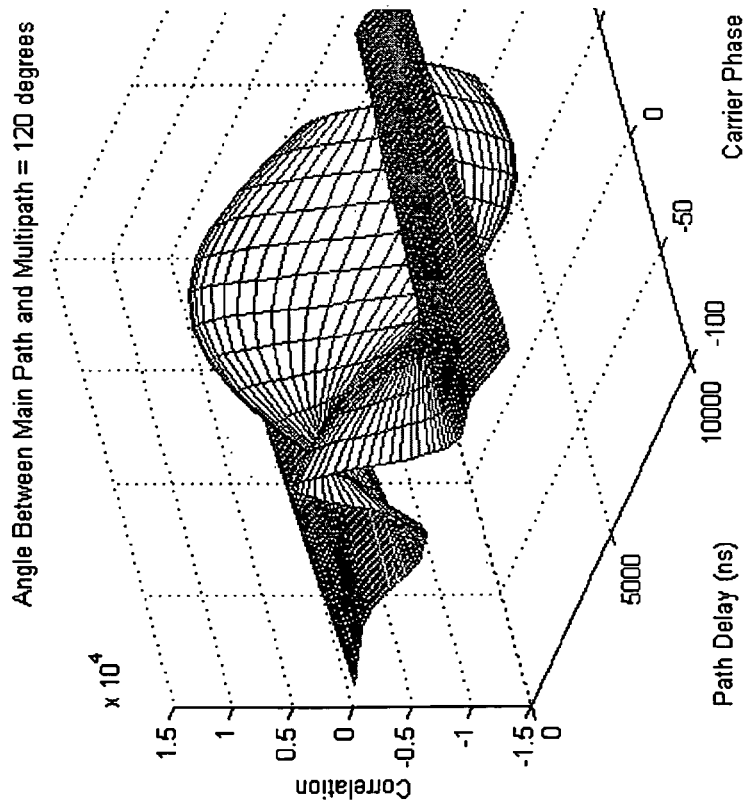

By comparison, FIGS. 15 and 16 are, respectively, three-dimensional and two-dimensional graphs where the angle between the main path and multipath is set at 120 degrees, rather than the 90 degrees shown in FIGS. 13 and 14. At 120 degrees, the main path amplitude is reduced, as particularly shown in FIG. 16.

Figures 17, 18:
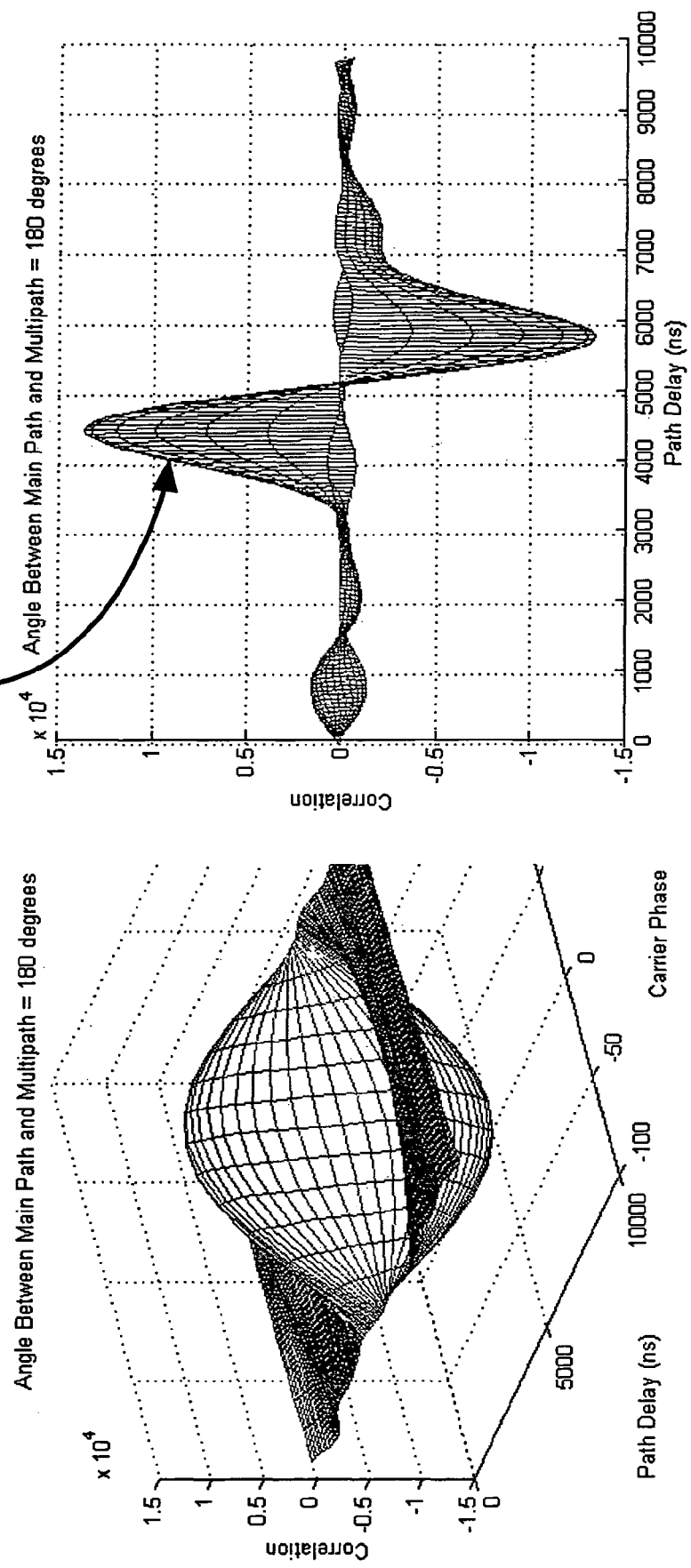

Finally, FIGS. 17 and 18 are three-dimensional and two-dimensional graphs, respectively, where the angle between the main path and multipath is 180 degrees. As shown in FIG. 18, destructive interference occurs between the multipath and main path causing a late leading edge curve fit TOA estimate.

FIGS. 11 through 18 illustrate the optimal advantages gained when the multipath component is at 90 degrees to the main path. The phase angle between the main or multipath (delayed) signal is of course arbitrary, so only on occasion will this quadrature condition occur. The preferred embodiment of the present invention waits for the quadrature condition to arbitrarily occur and then does leading edge curve fitting on the main path in the complex domain based on the signals obtained at the general occurrence of the quadrature condition. As shown in FIG. 19, the 90 degree angle between the main path and multipath gives the lowest TOA standard deviation. In theory, the quadrature condition can provide a TOA estimation brought to within a few dB of the Cramer-Rao bound. The present invention, as shown in FIG. 19, can avoid TOA estimation degradations of 5-10 dB due to worst case interference between the main path and the multipath. In the example of FIG. 19, the chip duration was set at 98 microseconds, C/NO=55 dB, and the number of trials was 100. As shown, the worst case interference occurred near zero degrees and 180 degrees, and the lowest TOA standard deviation occurred when the main path and the multipath were 90 degrees to each other.

The preferred embodiment of the present invention in which the quadrature condition is awaited provides improved accuracy over the narrow correlator or MEDLL prior techniques, which operate at all arbitrary phase angles between the direct path and the multipath. Further, the presently preferred embodiment can employ even more rapid measurements than required for smoothing across phase angles for several cycles. Further, extension of improved accuracy of P(Y)-code or M-code receivers is also possible with the present invention, without demanding large increases in SV transmit bandwidth.

In an alternative embodiment, the present invention relies upon a second QMFR principle (Q2) as well, namely if a signal is transmitted at a series of frequencies, and the spread of these frequencies is sufficient, a quadrature (or near-quadrature) condition can be forced to occur. Recognizing from the first principle, that the quadrature condition is the optimum condition for obtaining the leading edge curve fitting on the main path in the complex domain, the principle of Q2 seeks to force that advantageous condition to occur. This principle recognizes that the angle between the main path and the multiple path will differ at different frequencies, but if the signal is transmitted at a series of frequencies and the spread of those frequencies is sufficient, the quadrature condition (or near-quadrature condition) will be forced to occur. For this, the required frequency spread is:

where $\Delta f$ is the required frequency spread and $\Delta t$ is the delay between the main path $$\Delta f = \frac{1}{4\Delta t}$$

and the multipath. For example, to achieve quadrature condition for a multipath delay as small as ¼ chip of M-code would suggest:

$\Delta t = (¼)(1/(5\ MHz)) = 50$ ns, and $\Delta f = 1/(4*50\ ns) = 5$ MHz.

This principle is applied by having the transmitter frequency hop at a series of frequencies that span the required frequency spread. Then, a suitably-equipped receiver receives the GPS signal on all these frequencies, looks at the phase angle between the direct and multipaths, and chooses the hop frequency which comes closest to achieving the quadrature condition. A TOA measurement made on this frequency will have the best separation between the direct path and the multipath, and on average will have the lowest TOA error.

Thus, in the waveform transmitter, which may be either a space vehicle, or pseudolite, the QMFR implementation is as follows:

(1) for C/A-code: the waveform frequency hops over $F_c+/-1$ MHz for ¼ chip MP.

(2) for P(Y)-code: the waveform frequency hops over $F_c+/-5$ MHz for ¼ chip MP.

(3) for M-code: the waveform frequency hops over $F_c+/-2.5$ MHz for ¼ chip MP.

For P(Y) and M-code QMFR in space vehicles, the resultant waveform code exceeds the spectral allocation for GPS. Spectral spillover for M-code with QMFR will be limited to a small region because of the spot beam. The spot beam is a special focused energy beam transmitted from a special antenna located on the satellite, as opposed to the standard earth coverage GPS signal.

In pseudolite transmitters, pulsed operation minimizes interference with the signal from the space vehicle and reduces the effect of any spillover into frequency allocations other than those allocated to global navigation satellite system (GNSS).

Figure 20:
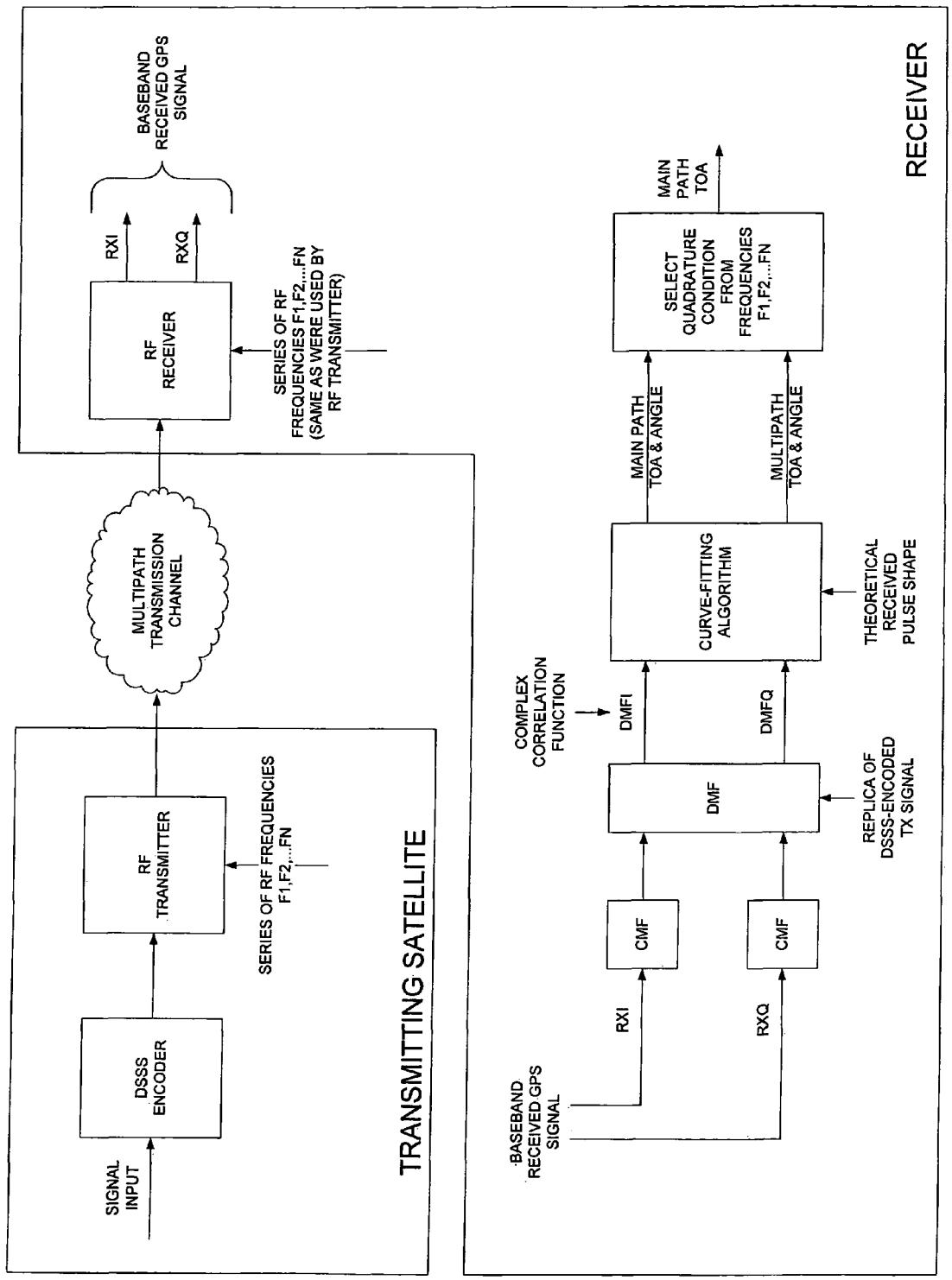
FIG. 20 illustrates a receiver embodiment in accordance with an example embodiment of the present invention.

FIG. 20 illustrates an example embodiment of a receiver employing aspects of the present invention. The receiver receives base band GPS signals "RXI" and "RXQ" and inputs them respectively into the chip matched filters (CMFs), which input them to the Digital Matched Filters (DMF), for correlation with a replica of the digital transmission signal. The output of the DMF is the complex correlation function DMFI and DMFQ. The complex correlation function is provided to the curve fitting algorithm portion, which also receives the theoretically received pulse shape. The curve fitting algorithm outputs main and multi path signals to the "select quadrature condition" portion (TOA and angle) where the quadrature condition is detected and timed for obtaining the TOA estimate. The select quadrature condition portion applies the principles of QMFR to obtain the main path TOA, in accordance with the principles previously identified.

The transmitter components include a standard GPS signal generator, RF frequency hopping device, which offsets the frequency of the transmitted GPS signal, and (for pseudolites only) a switching device to turn the transmitter rapidly on and off for pulsed operation.

The receiver components, shown in FIG. 20, include the RF frequency hopping device, which offsets the frequency of the received GPS signal in synchronization with the frequency hopped transmit signal. Also, for reception of pseudolites only, a switching device to turn the receiver rapidly on and off in synchronization with the pulse transmitter is required. Then, the correlator device is included in the receiver that generates the base band in-phase and quadrature components of the correlation between the received signal and a replica of the digital transmitted signal (in DMF, FIG. 20). The curve fitting device then implements the algorithm to determine amplitude, delay, and phase angle of (i) the direct signal and (ii) the largest of the delayed (multipath) signals. This occurs in the curve fitting algorithm box of FIG. 20. Finally, the receiver includes the selection device which decides which frequency hop comes closest to yielding the quadrature condition, and a leading edge curve fitting algorithm that performs the TOA estimation. This is included in FIG. 20 in the select quadrature condition box.

FIG. 21 illustrates the benefits of the present invention in resolving different multipath environment problems. The multipath environments, discussed in the background previously, including ground reflection, dominant single reflector, etc., are shown in the vertical left column. The user type and code type are shown across the top of the table, including users that are stationary versus mobile, and using C/A-code, M-code, etc. As described previously, the reference "Q1" refers to application of the first principle of the QMFR technique, namely the recognition of the quadrature condition having occurred for optimal curve fitting. Similarly, "Q2" refers to the second QMFR principle, namely that the quadrature condition can be forced via multi-frequency (MF) transmission. The table indicates in which instances and for which multipath problems, Q1 and Q2 are found to be faster than averaging, better at lower elevation angles, near instantaneous high accuracy measurements, or no benefit. As shown in the table, each of the various benefits, together with the Q1 and Q2 principles are illustrated.

In FIG. 22, recommended approaches for multipath mitigation, in addition to narrow correlation are shown. Again, the multipath problems are listed down the left vertical column and the user type and code types are listed across the horizontal top column. In FIG. 22, some of the combinations are recommended for QMFR, others are recommended for a combination of multipath-resistant antenna technology (ANT) together with QMFR, and still others are recommended with inertial aiding (IA) with or without QMFR, as shown.

From a review of the detailed description herein, the artisan can recognize that using QMFR provides substantial advantages in multipath mitigation for GPS users. The first principle of QMFR, noted herein as Q1, recognizes the quadrature condition between direct and delayed path and offers a faster means to high-accuracy than smoothing multi-path effects. The second QMFR principle, Q2, forces the quadrature condition to occur via multiple frequency transmission, and provides near instantaneous high-accuracy measurements under many multipath conditions. QMFR, which combines Q1 and Q2, gives users significantly improved accuracy in many multipath environments, as illustrated in FIGS. 21 and 22. Further, QMFR, when transmitted via a UHF-band pseudolite, supports high-accuracy navigation in urban canyons and inside of buildings.

Figure 23:
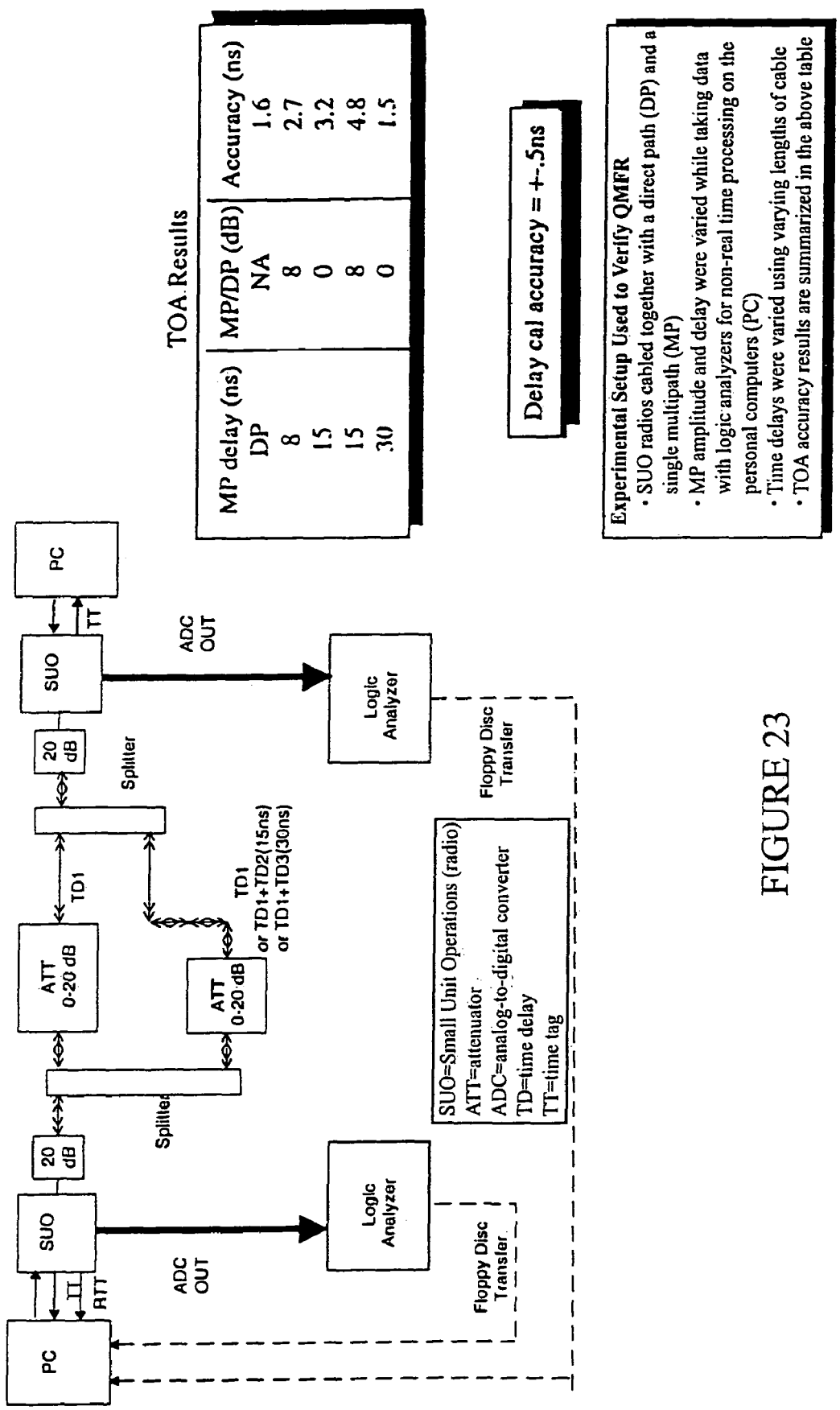
FIG. 23 illustrates QMFR experimental effectiveness in addressing the multipath problem.

Results applicable to urban environments and inside buildings can be seen in FIG. 23, where QMFR experimentation results are shown with respect to ITT's Small Unit Operation Situation Awareness System (SUO SAS or SUO) provided under contract to the Defense Advanced Research Projects Agency (DARPA). The experimental results show the QMFR provides accurate ranging with multipath as near in as ¼ chip (chip rate of 32 Mcps). In FIG. 23, the delay calibration accuracy was plus or minus 0.5 ns. Some differences between SUO and GPS are small unit operation signal levels being much higher due to closer range (1 km v. 10,000 km) and SUO signals being at UHF-band rather than L-band. This means that direct path signals can pass completely through some types of buildings and users can receive SUO signals even inside of buildings. Further, when using pseudolites, strong local area GPS signals can be provided with multiple frequencies to force the quadrature condition. Also, the UHF-band can be used for pseudolite signals to obtain better performance in urban environments. Both the urban and building environments are illustrated in FIGS. 21 and 22, as previously described.

The present invention can find application in a wide variety of different applications. First, receivers which detect the quadrature condition between the direct path of a delayed path (i.e., the multiple path) for the purpose of achieving better TOA measurement accuracy when the quadrature condition occurs, have immediate impact using the present invention. In fact, the normal motion of the satellites or motion of the receiver that causes variation in the phase angle between the direct and delayed paths can now be exploited to locate a quadrature or near quadrature condition and then perform TOA estimation with high-accuracy.

Further, transmitters which force the quadrature condition to occur also have application in the preferred embodiment of the present invention. By forcing the quadrature condition to occur, the following transmitters allow suitably equipped receivers to achieve high TOA measurement accuracy nearly instantaneously with multipath delay as close as ¼ chip (chip duration varying according to the code):
(i) satellite transmitter of C/A-code with frequency hopping over $F_c$ plus or minus 1 MHz;
(ii) satellite transmitter of P(Y)-code with frequency hopping over $F_c$ plus or minus 5 MHz;
(iii) satellite transmitter of M-code with frequency hopping over $F_c$ plus or minus 2.5 MHz;
(iv) pseudolite transmitter in the L-b and of any of the GPS codes with frequency hopping, but especially of M-code with frequency hopping over $F_c$ plus or minus 2.5 MHz;
(v) pseudolite transmitter in the UHF-band of any of the GPS codes with frequency hopping, but especially of M-code with frequency hopping over $F_c$ plus or minus 2.5 MHz. The UHF band is chosen because of its superior penetration through and into buildings. This facilitates reception of GPS signals in urban canyons and inside buildings.

Finally, the present invention may find application in receivers which frequency hop along with the preceding transmitters, deciding which frequency hop comes closest to the quadrature condition, and then carrying out leading edge curve fitting to achieve high accuracy TOA estimation.

The receivers and transmitters described above are applicable for improved performance against multipath in all environments where GPS is used, including terrestrial, marine, airborne and space.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A Direct Sequence Spread Spectrum (DSSS) transmitter comprising:
 a signal input to receive a first signal;
 an encoder to accept the first signal to encode the first signal by spread spectrum encoding;
 a transmitter to repeatedly and sequentially transmit the spread-spectrum encoded first signal at a series of frequencies such that the spread of these frequencies is sufficient to force at least a near-quadrature condition or occur in the event of a multipath condition;

the transmitter transmitting over a tramission channel whereby the transmitted encoded first signal is subject to the multipath condition and yielding a direct path signal and a multipath signal;

whereby said near-quadrature condition is a condition of a phase of the multipath signal relative to the direct path signal.

2. A Direct Sequence Spread Spectrum (DSSS) transmitter according to claim 1, wherein:

the spread of said series of frequencies is at least $\Delta f=\frac{1}{4}\Delta t$, where $\Delta f$ is the spread and $\Delta t$ is a delay associated with the multipath condition.

3. A Direct Sequence Spread Spectrum (DSSS) transmitter comprising:

an encoder to spread an information signal by encoding the information signal over a spread spectrum;

a transmitter to repeatedly transmit the already-spread first signal at a number of different carrier frequencies such that a spread of these carrier frequencies provides a near-quadrature condition to occur between the phases of direct path and multipath signals transmitted from said transmitter.

4. A Direct Sequence Spread Spectrum (DSSS) transmitter comprising:

a signal input to receive a first signal;

an encoder to accept the first signal and to encode the first signal by spread spectrum encoding;

a transmitter to transmit the spread-spectrum encoded first signal by frequency-hop transmitting the spread-spectrum encoded first signal of a series of frequencies such that the spread of these frequencies is sufficient to force at least a near-quadrature condition to occur in the event of a multipath condition;

the transmitter transmitting over a transmission channel whereby the transmitted encoded first signal is subject to the multipath condition and yielding a direct path signal and a multipath signal;

whereby said near-quadrature condition is a condition of a phase Of the multipath signal relative to the direct path signal.

5. A Direct Sequence Spread Spectrum (DSSS) transmitter according to claim 4, wherein:

the spread of said series of frequencies is at least $\Delta f=\frac{1}{4}\Delta t$, where $\Delta f$ is the spread and $\Delta t$ is a delay associated with the multipath condition.

* * * * *